Dec. 15, 1942.     D. B. HIBBETT     2,304,914
DIFFERENTIAL AUXILIARY UNIT
Filed May 13, 1942     2 Sheets-Sheet 1
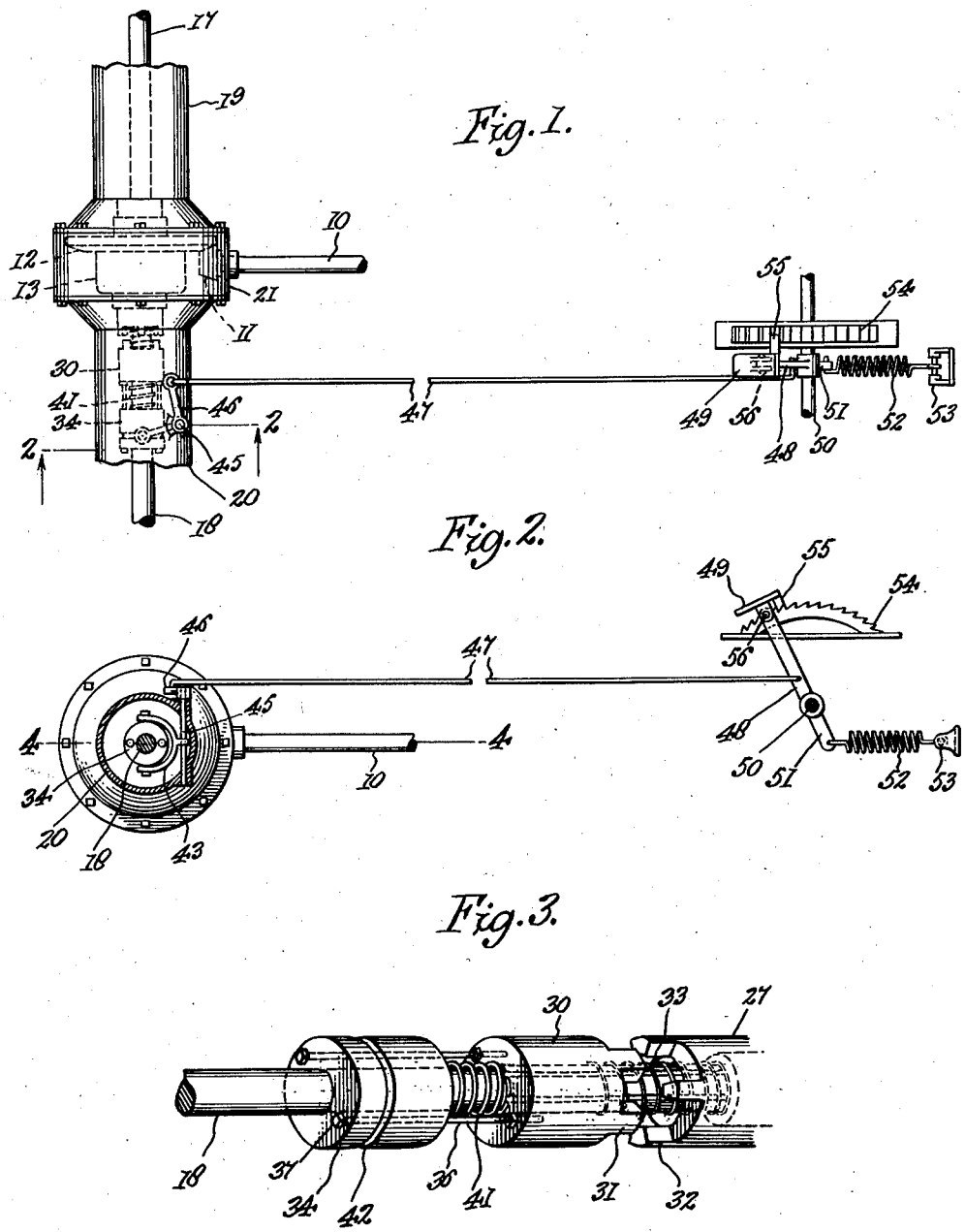
Inventor
David B. Hibbett
By Wilkinson & Mawhinney
Attorneys Dec. 15, 1942.  D. B. HIBBETT  2,304,914
DIFFERENTIAL AUXILIARY UNIT
Filed May 13, 1942  2 Sheets-Sheet 2
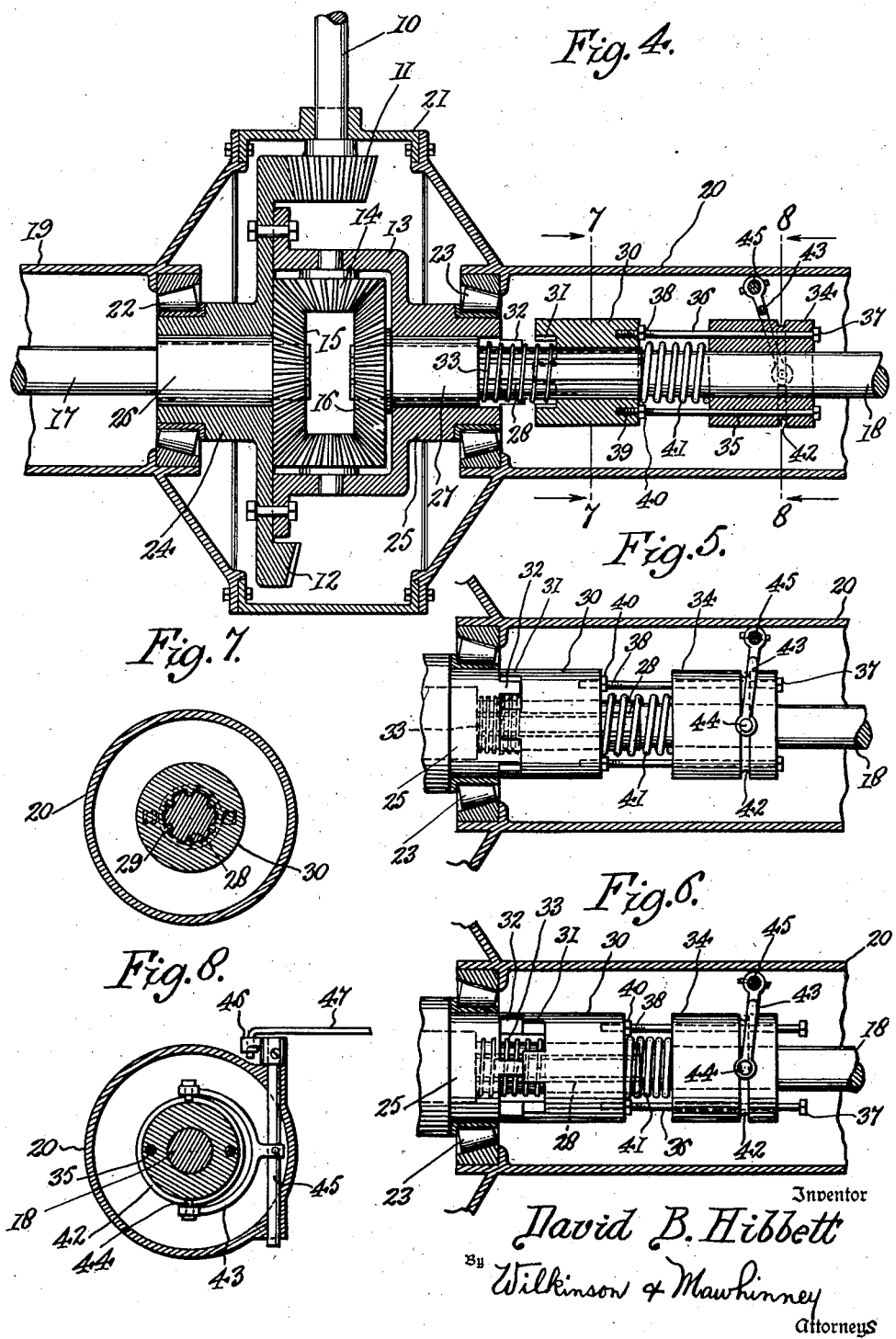

Patented Dec. 15, 1942

2,304,914

UNITED STATES PATENT OFFICE 2,304,914

DIFFERENTIAL AUXILIARY UNIT

David B. Hibbett, Lancaster, Calif.

Application May 13, 1942, Serial No. 442,806

6 Claims. (Cl. 74—316)

The present invention relates to improvements in differential auxiliary units and has for its main purpose and object to arrest excessive rotation of one of the rear axle sections of a vehicle, particularly a farm tractor, as where the wheel at that side is in soft ground.

Tractors, as now constructed employ differential constructions, and when encountering inclined terrain one of the rear wheels is at an abruptly higher elevation than the other rear wheel. When the tractor is traversing the side of a hill, the center of gravity of the tractor so shifts to the lower wheel that not sufficient load weight is imposed on the upper wheel to insure its sufficiently good traction with the ground. Consequently this upper wheel tends to rotate relatively to the ground at a faster rate than is the ordinary incident to the forward propelling movement of the tractor. This condition prevents the transmission of the power to the lower wheel which is sustaining probably 80% of the load. Obviously the movement and efficiency of the tractor are greatly diminished under circumstances of this kind.

It is an object of the invention to overcome these difficulties and in doing so to provide a mechanism which will selectively lock one of the rear axle half sections to the differential case, which is the part within the housing to which the ring gear is affixed and which carries around with it the spider pinions. It is a further object of the invention to provide an improved mechanism having the above characteristics in which it becomes necessary to lock only one axle section to the differential case; in which event should spinning occur in the unaffected axle, the latter will pick up and tend to spin the gear case, which will be arrested against the same spinning movement by being clutched by the new mechanism to the other axle section whose wheel sustains the weight or is upon solid ground and is therefore not subject to spinning.

A further object of the invention is to provide a free-play relation between the clutch teeth to insure adequate and quick engagement of the teeth when one of the clutch members is spinning relatively to the other, and to furthermore provide a duplex arrangement of normally rigid but relatively movable parts controlling clutch engagement in which strong spring pressure under potential energy is stored by preliminary mechanical manually controlled means for finally causing clutch engagement on registration of clutch teeth irrespective of high relative spinning rotation.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan view of a differential construction, with conventional related parts of the vehicle broken away, as constructed in accordance with the present invention.

Figure 2 is a vertical section taken on the line 2—2 in Figure 1.

Figure 3 is a perspective view of the improved differential auxiliary unit in disengaged position.

Figure 4 is a horizontal section, taken on an enlarged scale, through a differential mechanism showing the improved unit applied thereto in a disengaged position, such view being taken on the line 4—4 in Figure 2.

Figure 5 is a similar view, with parts broken away, and showing the unit in the engaged position.

Figure 6 is a similar view showing the potential compression of the outer stronger spring when clutch engagement is thwarted by clutch teeth obstruction.

Figure 7 is a transverse section taken on the line 7—7 in Figure 4, and

Figure 8 is a similar view taken on the line 8—8 also in Figure 4.

Referring more particularly to the drawings 10 designates the propeller shaft of an automobile, farm tractor or other vehicle employing a differential construction, of which 11 represents the drive pinion and 12 the ring gear. Such ring gear carries around with it the differential case 13 in which are journaled the spider pinions 14 disposed in mesh with the axle pinions 15 and 16. The axle pinion 15 drives the axle half section 17, while the complemental axle half section 18 is driven by the axle pinion 16. The axle sections 17 and 18 are contained in the rear axle housings 19 and 20 which are joined with the differential housing 21. Roller or other bearings 22 and 23, carried by the differential housing 21, serve to rotatably mount the parts of the differential. The sleeve trunnions 24 and 25 of the differential case 13 turn within the roller bearings 22 and 23 while the sleeve-trunnions 26 and 27 of the axle pinions 15 and 16 rotate within the sleeves 24 and 25. The sleeves 26 and 27 are splined to the respective axle sections 17 and 18. This is a part of the conventional differential construction. In Figure 7 the grooves in the axle section 18 for receiving the splines are indicated at 28.

These grooves 28 in axle section 18 are extended outwardly a greater distance from the conventional differential mechanism in position to slidingly receive the splines 29 carried by the slidable clutch collar 30. The teeth 31 of the clutch collar 30 are adapted to mate with and engage the teeth 32 formed upon the differential case sleeve 25. The teeth 31 and 32 are normally moved apart or out of engagement by a relatively light coil spring 33.

An operating collar 34 is freely mounted over the smooth portion of the axle section 18. The operating collar 34 is free to slide axially on the axle section 18. Such operating collar 34 has smooth-bore holes 35 made through it. These holes are preferably co-axial with the axis of movement of the operating sleeve 34, that is to say of the axis of the axle section 18. Disposed in the holes are smooth bolts 36 having bolt heads 37 of polygonal form to take a wrench or other appropriate tool for rotating the bolts 36 in order to cause their threaded ends 38 to be screwed home into threaded sockets 39 in the clutch collar 30. Lock nuts 40 threaded on the threaded portions 38 of the bolts prevent the retrograde rotation and the backing of the bolts out of the sockets 39. A heavy coil spring 41 is interposed between the clutch collar 30 and the operating collar 34 and normally maintains the collars apart.

An annular groove 42 in the operating collar 34 receives the pins 44 of the fork 43. The fork 43 is affixed to a vertical rock shaft 45 appropriately journaled in bearings in the axle housing 20 and extending up through and above such housing where the shaft 45 fixedly receives an arm 46. This arm is shown in Figures 1, 2 and 8. A rod 47 connects the arm 46 at the rear of the vehicle with a device at the front of the vehicle for controlling clutching and de-clutching of the unit. In the instance shown in Figures 1 and 2, the forward end of rod 47 is coupled to the shank 48 of a foot pedal 49 arranged conveniently to the foot of the operator of the tractor or other vehicle.

The shank and its foot pedal may conveniently be mounted about a pivot 50, the shank having a tail piece 51 below the pivotal point entrained by a coil spring 52 of suitable load having its free end connected fixedly to the anchorage 53. Alongside the foot pedal is a ratchet segment 54 over which runs a pawl 55 carried by the foot pedal 49 or its shank 48.

It will be clear from Figure 6 that the clutch teeth 31 are wider in a circumferential sense than the companion teeth 32. This is only one form of which the invention is susceptible in this detail, the important critical arrangement being that there should be substantial play between the clutching teeth, that is circumferential play.

In other words, as shown in Figure 6, the arcuate spaces between adjacent clutch teeth 32 are wider than the circumferential width of the inter-engaging teeth 31. This arrangement insures free engagement of the teeth when one of the clutch members is spinning relatively to the other.

In operation, the springs 33 and 41 will normally maintain the parts in the position shown in Figure 4 where the clutch is disengaged and the differential free to operate in its accustomed manner. However, when it is desired to suspend differential action, the operator pushes forwardly upon foot pedal 49, having previously released pawl 55 from ratchet 54. Such action pulls rod 47 forwardly, rotating arm 46 and rock shaft 45 and communicating rocking movement to arm 43 in the direction of movement to the left in Figure 5. The weaker lighter spring 33 will yield and the stronger spring 41 will cause clutch collar 30 to move concomitantly with operating collar 34 and to the same linear extent. This effects clutch engagement and the position shown in Figure 5 in which teeth 31 are intermeshed with teeth 32, thus locking axle section 18 to differential case 13. If desired the operator may cause pawl 55 to re-engage ratchet sector 54 whereby the reverse operations of springs 33 and 52 will be suspended while the tractor is continuously driven along the side of a hill for the requisite distance. At the end of the row the pawl 55 may be kicked out, releasing the mechanism to the restoring actions of the springs, one of which 33 has been compressed by the clutching action and the other 52 distended. Thus at each end of the rod 47 restoring springs operate upon the parts connected with the rod at those points.

Clutch engagement is not always so easily effected because of the spinning of an axle section relatively to the other section which causes relative spinning between the clutch teeth 31 and 32 during the effort to intermesh the same. In practice the condition illustrated in Figure 6 is often encountered where the clutch teeth are brought into an end on end obstructing abutment, thus resisting further axial motion of the clutch collar 30 in the direction of clutch engagement. In this event further movement of operating collar 34 toward clutch engagement is had during the course of the normal throw of the pedal 49 which is sufficient to accomplish clutch engagement. In other words collar 34 moves relatively to collar 30 and toward the latter, compressing the heavier spring 41, as shown in Figure 6. The rods or bolts 36 being held stationary by clutch collar 30, these rods act as guides and the operating collar 35 slides along the same, moving away from the bolt heads 37, which serve as stops or limiting means in the restoring motion of the operating collar 34. The relative movement of collar 34 toward collar 30 compresses spring 41 and places it in a potential position exerting a constant and extremely strong force upon clutch collar 30, urging the clutch collar 30 into clutch engaging position so that instantaneously when opportunity offers the heavy spring 41 will automatically effect engagement of the clutch, without any attention on the part of the operator. In other words the operator will in any event only be obliged to shift the pedal 49 forwardly through an appropriate angular distance necessary to secure clutch engagement. If it happens that he achieves his object in the manner indicated in Figure 5 the plan is carried out in a normal manner, but the operator is unconcerned and there is no further attention required of him should his voluntary action on the clutch pedal 49 fail to produce the desired clutch engagement because of the condition illustrated in Figure 6; nevertheless the arrangement is such that automatically the clutch collar 30 will be put under greater clutching pressure and under a constant urge to clutching position so that when the relative spinning slows or the force of the compress spring 41 exceeds the resistance created by the spinning clutch engagement is effected automatically.

The bolts 36 will bind the two collars against relative rotation but at the same time allow a limited relative axial motion. The bolts also prevent separation of the two collars and the heads 37 of the bolts limit the degree of the separating motion.

Each spring 33 and 41 is a helix constituted of a desired number, preferably relatively few, convolutions wound spirally and rather closely about the axle section 18. The short axial length of each helix provides for short axial clutch motion and therefore simplified operation while lessening expense. The position of the springs close to the axle 18 affords protection to the springs from without and the stability of the shaft from within. The simplicity of the device is one of its features in that rectilinear motion alone is responsible for the clutching and de-clutching actions of the mechanism.

The device is so constructed and arranged that the springs and duplex collar assembly can be very readily slipped over the end of the axle section 18 and slid into place without requiring any modification in the axle or differential construction save that clutch teeth are fashioned in the adjacent end of the differential case hollow trunnion 25, and the spline grooves 28 may be continued outwardly for a greater distance to lie within the perimeter of the clutch collar 30. The differential case trunnion 25 may be slightly elongated outwardly or toward the right as viewed in Figure 4 in order to provide sufficient material for the formation of the clutch teeth 32.

The axle housing 20 is substantially unmodified from conventional construction in that it simply need be equipped with the necessary bushings for the vertical shaft 45. The tension spring 52 associated with the pedal 49 constantly tends to bring the pedal 49 to an initial or zero position where the movable element of the clutch is withdrawn from its mate. In other words the spring 42 associated with the pedal will bias the parts to declutching position. The same function results from the springs 33 and 41.

The pedal shank 48 may have a loose fit about pivot 50 to enable sufficient sidewise movement of the pedal with relation to ratchet segment 54 to release and engage the pawl 55. It will be understood that any other type of control means at the forward position of the vehicle may be substituted for the clutch pedal arrangement, it only being necessary that some adequate means of operation be provided at a key position to control the clutching and de-clutching that is the suspension and resumption of differential action.

It will be understood that the improved unit may be positioned and located on either axle 18 or 17. In connection with its location on the axle 17 it would be clutched to the hollow sleeve trunnion 24 of the planetary case 13.

Instead of having enough play in pivot 50 to allow sidewise engagement and disengagement of ratchet and pawl, the foot pedal 49 may be mounted on the end of the shank 48 by a pivot 56, which would allow the pedal to rock back and forth. Thus the operator can engage and disengage the pawl with ratchet merely by a forward and backward tilt of his foot.

It is obvious that various changes and modifications may be made in the details of construction and design of the above specifically described embodiment of this invention without departing from the spirit thereof, such changes and modifications being restricted only by the scope of the following claims.

What is claimed is:

1. In a differential having a planetary case, and an axle section geared to the differential, an auxiliary unit comprising a clutch member fixed to the planetary case, a movable clutch member slidable axially on the axle and non-rotatively secured thereto, a clutch spring for biasing the movable member to disengaged position, an operating member slidable on the axle, a spring spacing the operating member from the movable clutch member, and a device to axially slide the operating member in the direction of clutch engagement.

2. A unit according to claim 1 characterized by the first-mentioned spring being weaker than the second-named spring.

3. A unit according to claim 1 in which rods are affixed to the movable clutch member and pass slidably through the operating member, and stops on the rods to arrest the linear travel of the operating member with respect to the movable clutch member in a direction to declutch.

4. In combination with a differential having a planetary case with a hollow trunnion formed with an outwardly-extended part provided with clutch teeth, an axle section, an axle pinion having a sleeve splined to the axle within the hollow trunnion and terminating short at its outer end of the like end of the trunnion to produce an annular recess about the axle concentrically of the trunnion end, a coil spring helically wound about the axle with its inner end received in said recess and abutting against the adjacent end of said sleeve, a movable clutch element splined to the axle and slidable therealong and having teeth complemental to first-named clutch teeth, the outer end of said coil spring engaging said clutch element to bias same to disengaged position.

5. In combination with a differential having a clutch element and an axle driven by the differential, of a coil spring slidable over the outer end of the axle and movable against the differential as a stop, and an assembly constituting a pre-assembled unit slidable over the outer end of the axle following said coil spring and comprising a clutch collar keyed slidably to the axle and movable axially of the axle into and out of clutching engagement with said clutch element and against the outer end of said coil spring, an operating collar slidable on the axle outwardly of and spaced from the clutch collar, a second coil spring stronger than said first-mentioned coil spring interposed between the two collars, guide rods projecting from the clutch collar on which the operating collar is slidable and stop means on the free ends of the rods limiting the separation of the collars by action of the stronger spring, and means adjacent the axle and placed to engage the operating collar when the latter and its assembly are shifted to final position on the axle for causing movement in the assembly in clutch-engaging direction.

6. A combination according to claim 5 further characterized by said rods being threaded, threaded sockets in said clutch collar to detachably receive the threaded parts of the rods, and lock nuts on the rods run up against the clutch collar.

DAVID B. HIBBETT.